(12) United States Patent
Wilkin

(10) Patent No.: US 6,741,010 B2
(45) Date of Patent: May 25, 2004

(54) ROTOR DISC ASSEMBLY HAVING ROTOR RIM WITH ALTERNATE MAGNETS AND LAMINATED POLE PIECES

(75) Inventor: Geoffrey A Wilkin, Cramlington (GB)

(73) Assignee: Rolls Royce PLC, Derby (GB)

( * ) Notice: Subject to any disclaimer, the term of this patent is extended or adjusted under 35 U.S.C. 154(b) by 120 days.

(21) Appl. No.: 09/755,114

(22) Filed: Jan. 8, 2001

(65) Prior Publication Data
US 2001/0008356 A1 Jul. 19, 2001

(30) Foreign Application Priority Data
Jan. 19, 2000 (GB) .............................................. 0001121

(51) Int. Cl.[7] .............................. H02K 1/22; H02K 1/18; H02K 1/28; H02K 1/06; H02K 1/00
(52) U.S. Cl. ...................... 310/268; 310/264; 310/261; 310/218; 310/217; 310/216; 310/156.02; 310/156.19; 310/156.48; 310/156.55; 310/156.57
(58) Field of Search .................. 310/268, 264, 310/261, 216–218, 156.02, 156.19, 156.48, 156.55, 156.57, 266

(56) References Cited

U.S. PATENT DOCUMENTS

| | | | | |
|---|---|---|---|---|
| 3,200,275 A | * | 8/1965 | Lindgren | 310/90 |
| 3,445,698 A | * | 5/1969 | Miko | 310/71 |
| 3,447,010 A | * | 5/1969 | Vreeland | 310/217 |
| 3,590,292 A | * | 6/1971 | Poliakoff | 310/90 |
| 3,693,035 A | * | 9/1972 | Ostwald | 310/51 |
| 3,832,581 A | * | 8/1974 | Hoffmann et al. | 310/46 |
| 3,992,641 A | * | 11/1976 | Heinrich et al. | 310/168 |
| 4,208,600 A | * | 6/1980 | Hatch | 310/178 |
| 4,260,920 A | * | 4/1981 | Nakamura et al. | 310/156 |
| 4,306,168 A | * | 12/1981 | Peachee | 310/217 |
| 4,477,745 A | * | 10/1984 | Lux | 310/156 |
| 4,510,680 A | * | 4/1985 | Miller et al. | 29/598 |
| 5,027,026 A | * | 6/1991 | Mineta et al. | 310/259 |
| 5,162,686 A | * | 11/1992 | Royer | 310/156 |
| 5,396,140 A | * | 3/1995 | Goldie et al. | 310/268 |
| 5,608,281 A | * | 3/1997 | Gerling et al. | 310/268 |
| 5,619,087 A | * | 4/1997 | Sakai | 310/268 |
| 5,811,908 A | * | 9/1998 | Iwata et al. | 310/261 |
| 5,877,578 A | * | 3/1999 | Mitcham et al. | 310/268 |
| 5,894,183 A | * | 4/1999 | Borchert | 310/261 |
| 5,952,755 A | * | 9/1999 | Lubas | 310/156.19 |
| 6,051,905 A | * | 4/2000 | Clark | 310/178 |
| 6,181,048 B1 | * | 1/2001 | Smith et al. | 310/261 |
| 6,384,504 B1 | * | 5/2002 | Ehrhart et al. | 310/156.55 |
| 6,603,232 B2 | * | 8/2003 | Van Dine et al. | 310/156.01 |

FOREIGN PATENT DOCUMENTS

| | | | |
|---|---|---|---|
| EP | 0 779 695 A1 | 6/1997 | |
| EP | 1122859 A2 | * 8/2001 | ............ H02K/1/27 |
| GB | 460040 | 1/1937 | |
| WO | WO 87/05164 | 8/1987 | |

\* cited by examiner

*Primary Examiner*—Dang Le
*Assistant Examiner*—Pedro J Cuevas
(74) *Attorney, Agent, or Firm*—Pillsbury Winthrop LLP

(57) ABSTRACT

A rotor disc (14), for use in an electrical machine (10), has at least one circumferential rotor rim (16) mounted thereon. The rotor rim (16) comprises at least one row of alternate magnets (20) and laminated pole pieces (18). The laminations in each pole piece (18) are mounted concentrically on a bolt (22) that extends through the rotor disc (14). A clearance (23) is provided between the laminations in each pole piece (18) and the bolt (22). The clearance (23) insulates the bolt (22) from the laminated pole pieces (18), which are made from a ferromagnetic material such as silicon-iron alloy, to minimize power losses due to eddy currents.

20 Claims, 2 Drawing Sheets

ROTOR DISC ASSEMBLY HAVING ROTOR RIM WITH ALTERNATE MAGNETS AND LAMINATED POLE PIECES

BACKGROUND OF THE INVENTION

1. Field of the Invention

The present invention relates to a rotor disc for use in an electrical machine and in particular to the construction of an active rim on the rotor disc.

2. Description of Background Information

Electrical machines, which operate in accordance with transverse flux principles, comprise an armature winding in the form of circular coil co-axial with a rotor. The rotor consists of one or more active rims comprising a multiplicity of magnets and laminated poles, fastened to the disc. The armature winding links the flux generated by the permanent magnets mounted on the rim of the rotor disc by means of a series of stator cores.

The rotor disc may support several rotor rims typically arranged in pairs on opposite sides of the disc. Each rotor rim is circumferential and consists of a single row of magnets and pole pieces.

European patent 0779695-B, in the name of Rolls-Royce Power Engineering plc, describes an arrangement in which the laminations in each pole piece are clamped by one or more bolts. The bolts pass through the lamination stack and the rotor disc. It is necessary for the rotor poles, which are made from a ferromagnetic material such as silicon-iron alloy, to be electrically insulated from the bolts passing through them to minimise power losses due to eddy currents.

Conventional methods of achieving the required insulation include providing an insulating coating on the surface of the bolt or sheathing the bolt with an insulated tube. The application of a coating to the bolt is expensive whilst the sheath may be damaged during installation and requires an additional assembly clearance which adversely affects build accuracy.

SUMMARY OF THE INVENTION

The present invention seeks to provide an insulated pole piece, which is not expensive to produce, has adequate insulation integrity and which more accurately locates the pole piece relative to the disc.

According to the present invention a rotor disc for use in an electrical machine has at least one circumferential rotor rim mounted thereon. The rotor rim comprises at least one row of alternate magnets and laminated pole pieces. The laminations in each pole piece are supported by at least one bolt which extends through the rotor disc. A clearance is provided between the laminations and the bolt passing therethrough. The clearance insulates the bolt from the laminations in each pole piece.

Preferably the laminations are mounted concentrically on the bolt in a radially spaced relationship to provide the insulating clearance. This eases assembly of the rotor rim, as a close fit is not required between the laminated pole pieces and the bolt.

The laminations may be bonded together to form a stack, the stack of bonded laminations being mounted concentrically on the bolt in a radially spaced relationship. Bonding the laminations into a stack gives a discrete component that is easier to assemble.

In the preferred embodiment of the present invention the stack of bonded laminations is mounted concentrically on the bolt in a radially spaced relationship by the provision of insulated annular members at either end of the stack. The insulated annular members may be recessed into either end to minimise the insulating clearance over most of the stack length and ease assembly with small radial clearances.

Preferably the insulated annular members are resilient and are formed from an elastomeric material, which allows them to be pressed into the recesses and ensures accurate location of the pole piece relative to the rotor disc.

The laminated pole pieces may be compressed. Preferably resilient means, such as nuts and spring washers, are provided on the bolt for compressing the laminated pole pieces. The nuts and spring washers maintain the correct compressive force on the laminated pole pieces throughout operation.

BRIEF DESCRIPTION OF THE DRAWINGS

The present invention will now be described with reference to the accompanying drawings in which.

DETAILED DESCRIPTION

Figure 1:
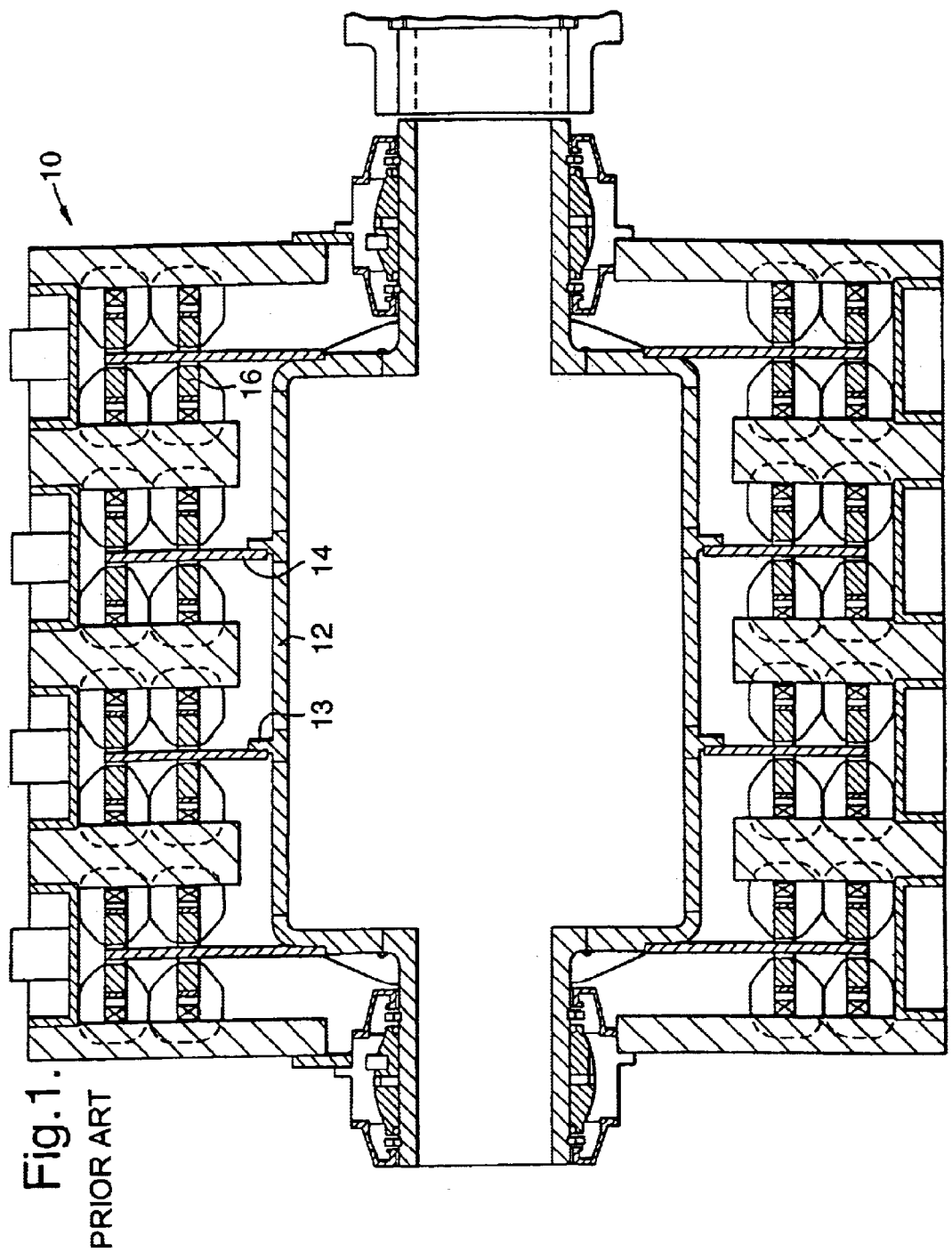
FIG. 1 is a cross-sectional view of a prior art transverse flux motor.

Referring to FIG. 1 a transverse flux motor, generally indicated at 10 comprises a rotor and a stator assembly.

The rotor assembly has four rotor discs 14 bolted to flanges 13 on a hollow shaft 12. Each disc 14 has four circumferential rotor rims 16 that support the active rotor components for four motor phases.

Figure 2:
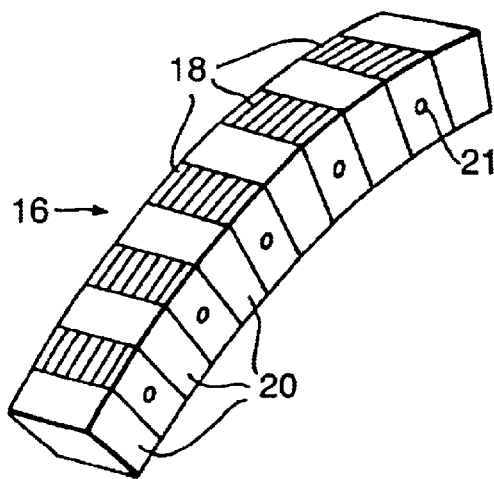
FIG. 2 is an enlarged view of part of one of the rotor rims shown in FIG. 1 having laminated pole pieces.

Each rim 16 consists of a single row of alternate pole pieces 18 and permanent magnets 20, FIG. 2. Suitable magnet materials are the high-energy rare earth magnet materials such as samarium cobalt and neodymium iron boron.

Figure 3:
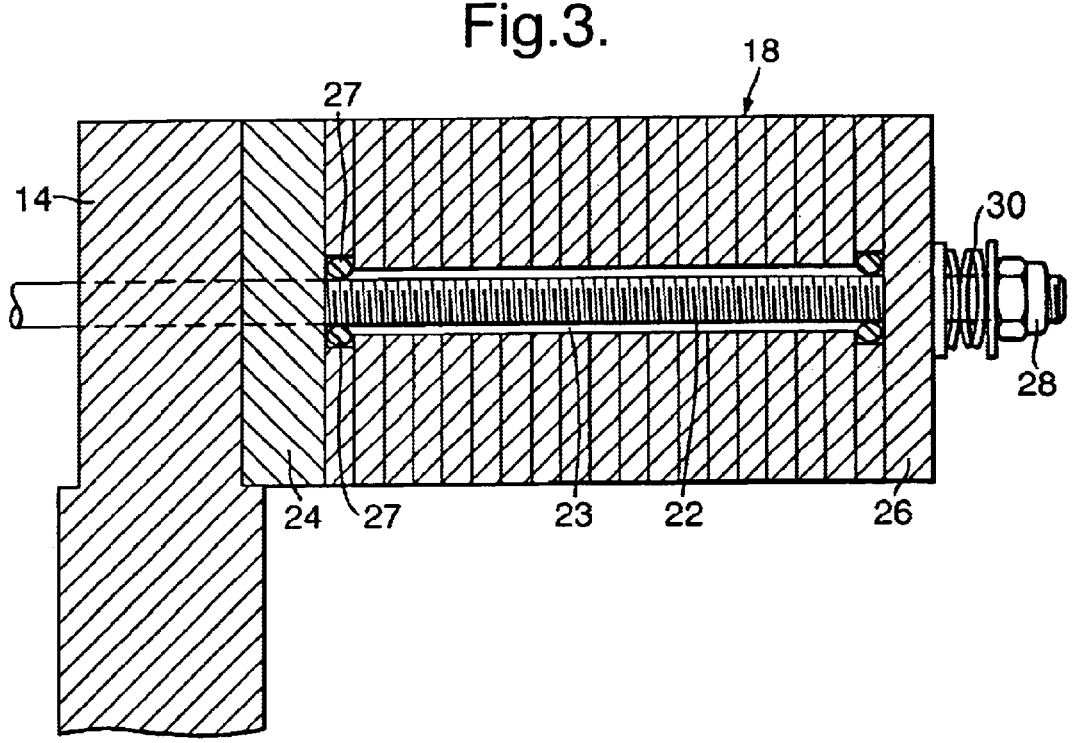
FIG. 3 is an enlarged cross-sectional view through one of the laminated pole pieces shown in FIG. 2 mounted in accordance with the present invention.

The pole pieces 18 are laminated and pre-bonded into a stack. Pre-bonding the laminations into a stack gives a discrete component that is easier to assemble onto the rotor 14. A bolt 22 passes through bolthole 21 to fasten the stack of laminations to the rotor disc 14, FIG. 3.

A compressive force is applied to the laminated pole piece 18 via two annular members 24 and 26 made from glass reinforced plastic. The outer annular member 26 is tightened down using nuts 28 and a number of sprung washers 30.

The sprung washers 30 are resilient so that the correct compressive force is maintained on the pole piece 18 regardless of relaxation in the stack of laminations and differential expansion of the rotor components. Retaining a compressive force on the laminated stack maintains the required structural stiffness and minimises deflections in the pole pieces 18 when in operation.

The pole pieces 18 are mounted concentrically on the bolt 22 in a radially spaced relationship so that a clearance 23 is created between the bolt 22 and the pole pieces 18. The clearance 23 acts to insulate the bolt 22 from the pole pieces 18, which are made from a ferromagnetic material such as silicon-iron alloy.

The pole pieces 18 are mounted in a radially spaced relationship with the bolt 22 by insulated annular members 27 located at either end. In the preferred embodiment of the present invention the annular members 27 are O-rings which are formed from a resilient material such as an elastomer. The O-rings 27 are self-centering and ensure that the laminations remain concentric.

The O-rings 27 are recessed into the ends of the pole pieces 18 to maintain a small clearance 23 between the bolt 22 and the pole pieces 18. Only a small clearance 23 is required due to the modest electrical insulation requirements. The clearance 23 need only insulate against a voltage of the order of 1 volt in order to limit the power loss due to eddy currents. In the preferred embodiment of the present invention a clearance 23 of the order of 0.25 mm is sufficient to insulate against a voltage of 1 volt whilst giving insufficient clearance to meet the demanding shock and vibration requirements of the transverse flux motor.

An arrangement in accordance with the present invention offers the advantages that it is easier to assemble, it offers good and reliable concentricity whilst eliminating the need for tight tolerances.

I claim:

1. A rotor disc assembly for use in an electrical machine, the rotor disc assembly comprising a rotor disc and at least one circumferential rotor rim mounted on the rotor disc, the rotor rim comprising at least one row of alternate magnets and laminated pole pieces comprising laminations, the laminations in each pole piece being supported by at least one uninsulated bolt having an uninsulated outer surface and which extends through the rotor disc, a clearance air gap extending the entire distance between the outer surface of the bolt and the laminations and being provided to electrically insulate the laminations from the bolt passing therethrough.

2. A rotor disc as claimed in claim 1, in which the clearance is provided by mounting the laminations concentrically on the bolt in a radially spaced relationship.

3. A rotor disc as claimed in claim 1, in which the laminations are bonded together to form a stack.

4. A rotor disc as claimed in claim 3, in which the stack of bonded laminations is mounted concentrically on the bolt in a radially spaced relationship by the provision of insulated annular members at either end of the stack.

5. A rotor disc as claimed in claim 4, in which the insulated annular members are recessed into either end of the stack.

6. A rotor disc as claimed in claim 4, in which the insulated annular members are resilient.

7. A rotor disc as claimed in claim 6, in which the annular members are formed from an elastomeric material.

8. A rotor disc assembly for use in an electrical machine, the rotor disc assembly comprising a rotor disc and at least one circumferential rotor rim mounted on the rotor disc, the rotor rim comprising at least one row of alternate magnets and laminated pole pieces comprising laminations, the laminations in each pole piece being supported by at least one bolt which extends through the rotor disc, a clearance air gap being provided to electrically insulate the laminations from the bolt passing therethrough, and means provided on the bolt for compressing the laminated pole pieces.

9. A rotor disc as claimed in claim 8, wherein the means for compressing the laminated pole pieces are resilient to maintain the correct compressive force on the laminated pole pieces throughout operation.

10. A rotor disc as claimed in claim 9, wherein the means for compressing the laminated pole pieces comprise nuts and spring washers.

11. A rotor disc assembly for use in an electrical machine, the rotor disc assembly comprising:

a rotor disc; and at least one circumferential rotor rim mounted on the rotor disc, the rotor rim including at least one row of alternate magnets and pole piece assemblies, each pole piece assembly having laminated pole pieces forming a lamination having a first end and a second end, a first insulating member on the first end of the lamination and positioned between the lamination and the rotor disc to electrically insulate the first end of the lamination from the rotor disc, a second insulating member on the second end of the lamination to electrically insulate the second end of the lamination, an uninsulated fastener having an uninsulated outer surface and extending through the rotor disc, the lamination, the first insulation member, and the second insulating member to attach the pole piece assembly to the rotor disc, and a clearance air gap extending the entire distance between the outer surface of the fastener and the lamination and provided between the lamination and the fastener to electrically insulate the lamination from the bolt.

12. A rotor disc assembly as claimed in claim 11, wherein the laminated pole pieces are annular, the first insulating member is annular, and the second insulating member is annular.

13. A rotor disc assembly as claimed in claim 11, wherein the first insulating member includes a first element that is positioned between the lamination and the fastener to radially space the lamination from the fastener.

14. A rotor disc assembly as claimed in claim 13, wherein the second insulating member includes a second element that is positioned between the lamination and the fastener to radially space the lamination from the fastener.

15. A rotor disc assembly as claimed in claim 13, wherein the lamination includes a recess, and the first element is an annular insulating ring positioned within the recess.

16. A rotor disc assembly for use in an electrical machine, the rotor disc assembly comprising:

a rotor disc; and at least one circumferential rotor rim mounted on the rotor disc, the rotor rim including at least one row of alternate magnets and pole piece assemblies, each pole piece assembly having laminated pole pieces forming a lamination having a first end and a second end, a first insulating member on the first end of the lamination and positioned between the lamination and the rotor disc to electrically insulate the first end of the lamination from the rotor disc, a second insulating member on the second end of the lamination to electrically insulate the second end of the lamination, a fastener extending through the rotor disc, the lamination, the first insulation member, and the second insulating member to attach the pole piece assembly to the rotor disc, and a clearance air gap provided between the lamination and the fastener to electrically insulate the lamination from the bolt, wherein the fastener is a bolt, and the second insulating member is positioned between the lamination and a nut attached to the bolt.

17. A rotor disc assembly as claimed in claim 16, wherein the nut secures a spring washer to the bolt and the spring washer is positioned between the nut and the second insulating member.

18. A rotor disc assembly as claimed in claim 11, wherein the laminated pole pieces are annular, the first insulating member is annular, and the second insulating member is annular, the first insulating member includes a first element that is positioned between the lamination and the fastener to radially space the lamination from the fastener, the second insulating member includes a second element that is positioned between the lamination and the fastener to radially space the lamination from the fastener.

19. A rotor disc assembly as claimed in claim 18, wherein the lamination includes a first recess and a second recess, and the first element is an annular insulating ring positioned within the first recess, and the second element is an annular insulating ring positioned within the second recess.

20. A rotor disc assembly as claimed in claim 19, wherein the fastener is a bolt, and the second insulating member is positioned between the lamination and a nut attached to the bolt, and the nut secures a spring washer to the bolt and the spring washer is positioned between the nut and the second insulating member.

* * * * *